(12) United States Patent
Elder et al.

(10) Patent No.: US 10,892,936 B2
(45) Date of Patent: Jan. 12, 2021

(54) SPANNING TREE PROTOCOL

(71) Applicant: Metaswitch Networks Limited, Middlesex (GB)

(72) Inventors: Alan Elder, Middlesex (GB); Jonathan Harrison, Middlesex (GB)

(73) Assignee: Metaswitch Networks Limited, Enfield (GB)

( * ) Notice: Subject to any disclaimer, the term of this patent is extended or adjusted under 35 U.S.C. 154(b) by 0 days.

(21) Appl. No.: 14/673,637

(22) Filed: Mar. 30, 2015

(65) Prior Publication Data
US 2015/0281405 A1    Oct. 1, 2015

(30) Foreign Application Priority Data

Mar. 31, 2014    (GB) .................................. 1405776.4

(51) Int. Cl.
 *H04L 12/24*    (2006.01)
 *H04L 12/753*    (2013.01)

(52) U.S. Cl.
 CPC ...... *H04L 41/0213* (2013.01); *H04L 41/0803* (2013.01); *H04L 45/48* (2013.01)

(58) Field of Classification Search
 CPC .. H04L 41/0213; H04L 41/0803; H04L 45/48
 See application file for complete search history.

(56) References Cited

U.S. PATENT DOCUMENTS

| | | | | |
|---|---|---|---|---|
| 4,811,337 A * | 3/1989 | Hart | ...................... | H04L 12/462 370/256 |
| 6,188,694 B1 * | 2/2001 | Fine | .................... | H04L 12/4645 370/402 |
| 6,330,229 B1 * | 12/2001 | Jain | ..................... | H04L 12/4625 370/256 |
| 6,580,715 B1 * | 6/2003 | Bare | ....................... | H04L 45/12 370/252 |
| 6,678,241 B1 * | 1/2004 | Gai | ....................... | H04L 12/462 370/216 |
| 6,801,506 B1 * | 10/2004 | Dey | ......................... | H04L 45/00 370/256 |
| 6,898,189 B1 * | 5/2005 | Di Benedetto | ......... | H04L 41/00 370/217 |
| 7,061,875 B1 * | 6/2006 | Portolani | .............. | H04L 12/462 370/256 |
| 7,352,748 B1 * | 4/2008 | Rozario | .............. | H04L 12/4625 370/392 |
| 7,411,915 B1 * | 8/2008 | Spain | .................. | H04L 41/0806 370/250 |
| 7,606,939 B1 * | 10/2009 | Finn | .................... | H04L 12/4645 709/246 |

(Continued)

*Primary Examiner* — Blake J Rubin
(74) *Attorney, Agent, or Firm* — Stetina Brunda Garred and Brucker

(57) ABSTRACT

The invention provides a method and apparatus for managing operation of a spanning tree protocol process in a network bridge. This comprises setting the network bridge to either an active mode or a defer mode in which a spanning tree protocol process is not run in response to a triggering event. The system remains in the defer mode for a period of time in which no further operations of the state machines will take place, before reverting to the active mode and normal processing of triggering events is carried out.

14 Claims, 3 Drawing Sheets

(56) References Cited

U.S. PATENT DOCUMENTS

| | | | | |
|---|---|---|---|---|
| 7,701,881 B1* | 4/2010 | Sankaran | H04L 12/462 | 370/256 |
| 7,710,882 B1 | 5/2010 | Previdi et al. | | |
| 7,782,869 B1* | 8/2010 | Chitlur Srinivasa | G06F 9/5011 | 370/230 |
| 7,877,483 B1* | 1/2011 | Finn | H04L 12/4641 | 370/256 |
| 7,903,586 B2* | 3/2011 | Rose | H04L 12/42 | 370/222 |
| 7,911,982 B1* | 3/2011 | Dalvi | H04L 12/462 | 370/256 |
| 7,965,638 B1* | 6/2011 | Schzukin | H04L 47/10 | 370/229 |
| 8,031,709 B2* | 10/2011 | Alexander, Jr. | H04L 12/4645 | 370/389 |
| 8,077,604 B1* | 12/2011 | Kanekar | H04L 12/4641 | 370/219 |
| 8,427,969 B1* | 4/2013 | Juillard | H04L 41/12 | 370/252 |
| 9,059,901 B1* | 6/2015 | Kumar | H04L 49/557 | |
| 9,231,831 B2* | 1/2016 | Chiueh | H04L 41/12 | |
| 9,548,926 B2* | 1/2017 | Raman | H04L 47/125 | |
| 9,608,903 B2* | 3/2017 | Eastlake, III | H04L 45/04 | |
| 2003/0009092 A1* | 1/2003 | Parker | A61B 5/14552 | 600/344 |
| 2003/0097468 A1* | 5/2003 | Hamadi | H04L 45/00 | 709/238 |
| 2004/0190454 A1* | 9/2004 | Higasiyama | H04L 12/4625 | 370/238 |
| 2005/0013260 A1* | 1/2005 | Ramanathan | H04L 12/4625 | 370/256 |
| 2005/0050220 A1* | 3/2005 | Rouyer | H04L 45/48 | 709/232 |
| 2005/0237943 A1* | 10/2005 | Sasagawa | H04L 12/462 | 370/242 |
| 2006/0114912 A1* | 6/2006 | Kwan | H04L 12/5693 | 370/395.4 |
| 2006/0146845 A1* | 7/2006 | Rose | H04L 12/462 | 370/402 |
| 2006/0268748 A1* | 11/2006 | Rose | H04L 12/462 | 370/256 |
| 2006/0285499 A1* | 12/2006 | Tzeng | H04L 45/00 | 370/249 |
| 2007/0025275 A1* | 2/2007 | Tallet | H04L 45/02 | 370/255 |
| 2007/0030803 A1* | 2/2007 | Gooch | H04L 47/2433 | 370/230 |
| 2007/0058571 A1* | 3/2007 | Rose | H04L 12/462 | 370/256 |
| 2007/0086361 A1* | 4/2007 | Allan | H04L 12/462 | 370/254 |
| 2007/0274295 A1* | 11/2007 | Nishimura | H04L 45/02 | 370/352 |
| 2008/0049621 A1* | 2/2008 | McGuire | H04L 12/24 | 370/236.2 |
| 2008/0062862 A1 | 3/2008 | Goyal et al. | | |
| 2008/0123561 A1* | 5/2008 | Sharma | H04L 45/00 | 370/256 |
| 2008/0181138 A1* | 7/2008 | Dalberg | H04L 12/66 | 370/256 |
| 2008/0198769 A1* | 8/2008 | Tzeng | H04L 45/00 | 370/256 |
| 2008/0215910 A1* | 9/2008 | Gabriel | H04L 12/4641 | 714/4.1 |
| 2008/0240129 A1* | 10/2008 | Elmeleegy | H04L 47/10 | 370/401 |
| 2008/0250137 A1* | 10/2008 | Zufelt | H04L 41/0663 | 709/224 |
| 2008/0259798 A1* | 10/2008 | Loh | H04L 45/302 | 370/235 |
| 2008/0304428 A1* | 12/2008 | Stilling | H04L 12/462 | 370/256 |
| 2009/0190503 A1* | 7/2009 | Tallet | H04L 45/48 | 370/256 |
| 2009/0279549 A1* | 11/2009 | Ramanathan | G06F 8/65 | 370/395.4 |
| 2010/0254264 A1* | 10/2010 | Ford | H04L 47/10 | 370/235 |
| 2010/0290479 A1* | 11/2010 | Baron | H04L 12/4625 | 370/401 |
| 2011/0026437 A1* | 2/2011 | Roja-Cessa | H04L 45/123 | 370/256 |
| 2011/0044346 A1* | 2/2011 | Mueller | H04L 1/0003 | 370/401 |
| 2011/0116366 A1* | 5/2011 | Smith | H04L 45/02 | 370/225 |
| 2011/0222440 A1* | 9/2011 | Phillips | H04L 45/48 | 370/256 |
| 2011/0235524 A1* | 9/2011 | North | H04L 45/28 | 370/242 |
| 2011/0255405 A1* | 10/2011 | Dorau | B60H 1/247 | 370/235 |
| 2012/0008530 A1* | 1/2012 | Kulkarni | H04L 12/42 | 370/256 |
| 2012/0033668 A1* | 2/2012 | Humphries | H04L 12/185 | 370/390 |
| 2012/0051252 A1* | 3/2012 | Iwao | H04L 45/18 | 370/252 |
| 2012/0155245 A1* | 6/2012 | Zhang | H04L 12/437 | 370/216 |
| 2013/0039170 A1* | 2/2013 | Higgins | H04L 12/437 | 370/228 |
| 2013/0064137 A1* | 3/2013 | Santoso | H04L 49/70 | 370/254 |
| 2013/0301440 A1* | 11/2013 | Yajima | H04L 43/0811 | 370/252 |
| 2013/0301553 A1* | 11/2013 | Klein | H04W 84/12 | 370/329 |
| 2013/0308437 A1* | 11/2013 | Hayakawa | H04W 24/04 | 370/216 |
| 2013/0343229 A1* | 12/2013 | Gasparakis | H04L 45/48 | 370/256 |
| 2014/0003295 A1* | 1/2014 | Gossain | H04L 12/2838 | 370/256 |
| 2014/0133360 A1* | 5/2014 | Chiueh | H04L 45/48 | 370/256 |
| 2015/0006755 A1* | 1/2015 | Turlington | H04L 47/20 | 709/233 |
| 2015/0016473 A1* | 1/2015 | Wakabayashi | H04L 69/22 | 370/474 |
| 2015/0055486 A1* | 2/2015 | Maggiari | H04L 41/5035 | 370/242 |
| 2015/0124655 A1* | 5/2015 | Saxena | H04L 41/0803 | 370/256 |
| 2015/0222491 A1* | 8/2015 | Clark | H04L 45/48 | 370/256 |

\* cited by examiner

SPANNING TREE PROTOCOL

CROSS REFERENCE TO RELATED APPLICATIONS

The present application claims priority to UK Patent Application No. 1405776.4 filed Mar. 31, 2014, the entirety of the disclosure of which is expressly incorporated herein by reference.

STATEMENT RE: FEDERALLY SPONSORED RESEARCH/DEVELOPMENT

Not Applicable.

FIELD OF THE INVENTION

The present invention relates to operation of a Spanning Tree Protocol and in particular how the protocol is operated under different loads.

BACKGROUND OF THE INVENTION

The Spanning Tree Protocol is a network protocol which is designed to maintain a loop-free topology in a bridged local area network. A family of spanning tree protocols is defined in IEEE 802.1D and IEEE 802.1Q, the content of which is incorporated herein. These protocols are widely deployed in Ethernet networks. The family of Spanning Tree Protocols includes the original Spanning Tree Protocol (STP), Rapid Spanning Tree Protocol (RSTP) and Multiple Spanning Tree Protocol (MSTP). RSTP is an extension of the original STP and provides significantly faster conversions after a change in the topology of a network. MSTP is a further extension to RSTP to allow it to construct different active topologies for different VLANs which can be useful for load balancing traffic. The configuration and operation of these protocols is defined by the IEEE standards mentioned above as a series of interconnected state machines. FIG. 1 shows FIG. 13-13 from IEEE 802.1Q-2011 (page 354). This figure shows the series of interconnected state machines used to operate the STP protocols.

The basic function of the Spanning Tree Protocol is to allow the bridges of a Bridged Local Area Network (referred to as a network herein) to collectively determine a spanning tree for controlling communication across the network. Such a spanning tree ensures that there are unique paths between all bridges on the network and avoids the formation of loops. Loops are particularly disadvantageous in such networks as frames can end up being endlessly switched around the network leading to saturation of the network capacity and potentially complete failure of the network. It is therefore extremely important that such loops are avoided.

The Spanning Tree Protocol is therefore used to establish a spanning tree based on the current layout and state of the elements of a network. However, the topology of a network can change. The removal of a bridge from a network or even the disabling of one port on a bridge, may result in the path between two elements on the network being removed. It would therefore be necessary for the spanning tree to be modified or recalculated to provide an alternative link path between each of the elements of the network to allow continued communication between them. This active responsiveness to changes in topology requires active monitoring and maintenance using the Spanning Tree Protocol.

As indicated above, the bridges collectively compute the spanning tree, with each bridge making its own calculations to determine which ports on that bridge are used for what purpose. Each bridge will therefore have to run the state machines shown in FIG. 1 in order to establish how it should manage its own ports. It will then communicate with other bridges in the network using special frames called Bridge Protocol Data Units (BPDUs) to exchange information about themselves and the network with other bridges in the network.

For example, the network initially needs to determine a root bridge which acts as the root of the spanning tree. Once the root bridge has been determined, each bridge then determines the least cost path to the root bridge, to establish which port is connected to the path that has the least cost to the root bridge. That port is then determined as the root port and communication with the root bridge will be made through that port.

For each Local Area Network (LAN) connected to ports on two or more bridges, it is necessary to determine a designated port for that LAN on a suitable bridge. Thus for a given LAN connected to two or more bridges, one of the ports on one of the bridges will be determined to be the designated port for that LAN and communication between that LAN and the root bridge will pass through the designated port. For each LAN, if the bridge with the port selected as the designated port for that LAN has any other ports to the same LAN, these ports are determined to be backup ports. Once the root ports, designated ports and backup ports have been determined, the remaining ports will normally be selected as alternate ports (although some versions of the standard allow different port roles to be defined). Ports with roles Alternate or Backup are blocked, meaning that frames are not switched through those ports.

The configuration of the spanning tree for a given network is defined in detail in the IEEE standards mentioned above.

From the above, it will be apparent that when a network is initially configured or when the topology has changed, a significant amount of calculation must be done to establish the correct states for the bridge and its ports. This is done by running the state machines shown in FIG. 1, as defined in the IEEE standard. As part of this, a considerable amount of information must be exchanged between the bridges so that each bridge can collect suitable information about which bridge is to be the root, the path cost to the root and so on. In order to establish the state of the bridges, the state machines in each bridge run until they reach a stable state. Once the state machines in all the bridges are stable, then it can be said that the network has reached steady state, at that moment in time.

However such a stable state may be disturbed by some event which requires the status of the spanning tree state machines to be reviewed, for example the reception of an external input such as a timer pop, a received packet, or a port going down. The reference to an "external input" refers to inputs which are external to the spanning tree state (e.g. a timer pop is internal to the bridge but external to the state machines). Such input events cause the state machines to run again until they reach a stable state.

It will be appreciated that when one or part of a network changes then this may trigger the state machines in one bridge to run and potentially determine a different set of conditions/states. This will be communicated using BPDU frames to advise the other bridges in the network of the change in its state. The reception of such frames by other bridges will cause them to run their own state machines until they again reach a stable state based on the newly received information. It will be appreciated that the changes may create a cascade of changes of state in other bridges as each of the bridges recalculate their own states and issue BPDU frames to other bridges which in turn cause them to calculate their own state and so on.

This creates a substantial load on the controllers within each of the bridges that have to operate the state machines. As the state machines run in response to external inputs, if the level of such inputs increases, as they will when the network is under higher load, this increased load can lead to substantial degradation in the performance of the Spanning Tree Protocol. This effect is particularly noticeable as the number of ports on a given bridge is increased.

The non-linear degradation in performance relative to the number of ports on a bridge is explained below with reference to the FIG. 1, which shows the various state machines that operate when the bridge state has to be recalculated.

Firstly, a larger number of ports means there will be a larger number of external inputs (such as per-port timer pops). Secondly, in a single bridge, where an external input has caused the state machines to be run, it will be appreciated that the amount of work increases with the number of ports. For example, some of the state machines that have to be run in order to return the bridge to a stable state are required to be run for each of the ports on the bridge.

Additionally, looking at FIG. 1, when the Port Role Selection (PRS) state machine (shown in the centre of FIG. 1) runs, it examines all ports on the bridge. Consequently the performance cost of running the PRS state machine increases as the number of ports on the bridge increases. Similarly, procedures such as SetSyncTree( ) within the Port Role Transitions (PRT) state machine (shown below the PRS state machine in FIG. 1) also examines all the ports on the bridge and so its performance is also related to the number of ports.

It will therefore be appreciated that if there are a large number of external events (i.e. the system is under load), particularly for a bridge having a large number of ports, the amount of time spent running the spanning tree state machines is significant. Additionally, if there are a large number of ports on the bridge then the total input events from all of these ports results in an increased load and further degradation in the performance for the establishment of a stable spanning tree.

Slow performance of one bridge within the network is bad for the overall network because if one node becomes overloaded, it may delay both sending BPDU frames and processing received BPDU frames. This can have a knock-on effect around the rest of the network with the end result that the whole network is overloaded and potentially the network becoming practically inoperable.

It is therefore an aim of the present invention to overcome or at least ameliorate some of the problems referred to above.

SUMMARY OF THE INVENTION

Therefore, according to the present invention there is provided a method for managing operation of a in a network bridge, the method comprising: setting the network bridge to either: an active mode, in which said spanning tree protocol process is run in response to a triggering event; or a defer mode in which said spanning tree protocol process is not run immediately in response to a triggering event; and reverting from said defer state to said active mode after a delay period.

By setting a defer mode, the operation of the network bridge can continue without having to carry out the spanning tree protocol process in response to every triggering event. This means that the operation of the network bridge and the spanning tree operation can continue with a reduced work load. This helps to reduce delays in the system which could lead to slow running of the network or worse.

The defer mode is preferably set in response to running of the spanning tree protocol process. This means that once a spanning tree process is run, it will not run again until the defer mode has been reverted back to active mode after the delay period.

The delay period is preferably based upon the load on the network bridge. The load on the network bridge can be determined in different ways. For example, the delay period may be based upon the number of pending tasks in a queue on the network bridge when the defer mode is set. Alternatively, the delay period may be a fixed period of time. The fixed period may be altered periodically based on the load.

When the defer mode is set, a new task can be added to the queue. By adding an item to the queue, other items in front of it in the queue are processed before the new task is reached. When the new item reaches the front of the queue, this can trigger ending of the delay period. In this way, the delay period is determined by the number of items in front of the new item in the queue and how long it takes to process those items, which reflects the load on the network bridge.

The network bridge may include a token counter. The method may further comprise periodically increasing the value of the token counter, whilst it is less than a maximum value. The value of said token counter can be reduced when the spanning tree protocol process is run. The said defer mode can be set in response to running of the spanning tree protocol process when the token counter has a zero value, wherein the delay period corresponds to the period in which the token counter has a zero value. With this arrangement, the method limits the rate at which the spanning tree protocol process can be run under high load conditions but under lower load conditions, the process can be run immediately and for a short transient burst of work, the immediate running of the spanning tree protocol process can still be allowed.

In the above arrangement, the rate at which the value of said token counter is periodically increased may be based on the maximum desired rate for running the spanning tree protocol process under high load conditions.

The method of the present invention preferably further comprises storing any triggering events received when the defer mode is set, so that it can be processed when the spanning tree protocol process is run. In this way, if a number of triggering events have been received whilst the defer mode is set, when the spanning tree protocol process is run, any changes in state or state variables from each of the triggering events can be taken account of.

In the invention, the running of the spanning tree protocol process preferably includes running a plurality of state machines to determine a stable state of the network bridge parameters.

The present invention further provides a network bridge for operating a spanning tree protocol process, the bridge comprising: a controller arranged to run a spanning tree protocol process in response to a triggering event, wherein said network bridge can be set to be in either: an active mode, in which said processor runs a spanning tree protocol process run in response to a triggering event; or a defer mode in which a spanning tree protocol process is not run in response to a triggering event, and said controller is arranged to revert said network bridge from said defer mode to said active mode after a delay period.

The controller is preferably arranged to set said defer mode in response to running of said spanning tree protocol process.

The delay period may be based upon the load on the network bridge. For example, this may be achieved by basing the delay period upon the number of pending tasks in a queue on the network bridge when the defer mode is set.

The controller is preferably arranged to add a new task to the queue as the defer mode is set. Then, when the new task reaches the front of the queue, this can signify the end of the delay period.

Alternatively, the network bridge may include a token counter wherein the controller is arranged to: periodically increase the value of the token counter, whilst it is less than a maximum value; reduce the value of the token counter when the spanning tree protocol process is run; and set the defer mode in response to running of the spanning tree protocol process when the token counter has a zero value, wherein the delay period corresponds to the period in which the token counter has a zero value.

The controller is preferably arranged to periodically increase the value of the token counter at a rate based on the maximum desired rate for running the spanning tree protocol process under high load conditions.

The controller preferably stores any triggering events received when the defer mode is set, so that they can be processed when the spanning tree protocol process is run again.

Preferably, the spanning tree protocol process run by the controller includes running a plurality of state machines to determine a stable state of said network bridge parameters.

DESCRIPTION OF THE PREFERRED EMBODIMENTS

However, under high load conditions, the state machines may not have completed their operation and returned to a stable state before further inputs have arrived which may again require the state machines to restart. Furthermore, any break between running of the state machines may not allow sufficient time for other tasks to be run.

The present invention aims to deal with this issue by running the state machines as normal under normal load conditions but deferring the running of the state machines when the system is under load. It is generally undesirable to defer running the state machines after receiving an input, as this would delay the establishment of the new spanning tree for the network. However, the present invention provides a system which recognises when a system is under load and only defers running of the state machines under those conditions to prevent the perhaps more undesirable situation of overloading the bridge controller.

In this way, when the system is not under load, the state machines will respond rapidly to inputs ensuring that the system responds quickly to changes. However when the system is under load, it defers running the state machines to minimise the amount of work that the system has to do to thereby improve the overall performance.

Figure 1:
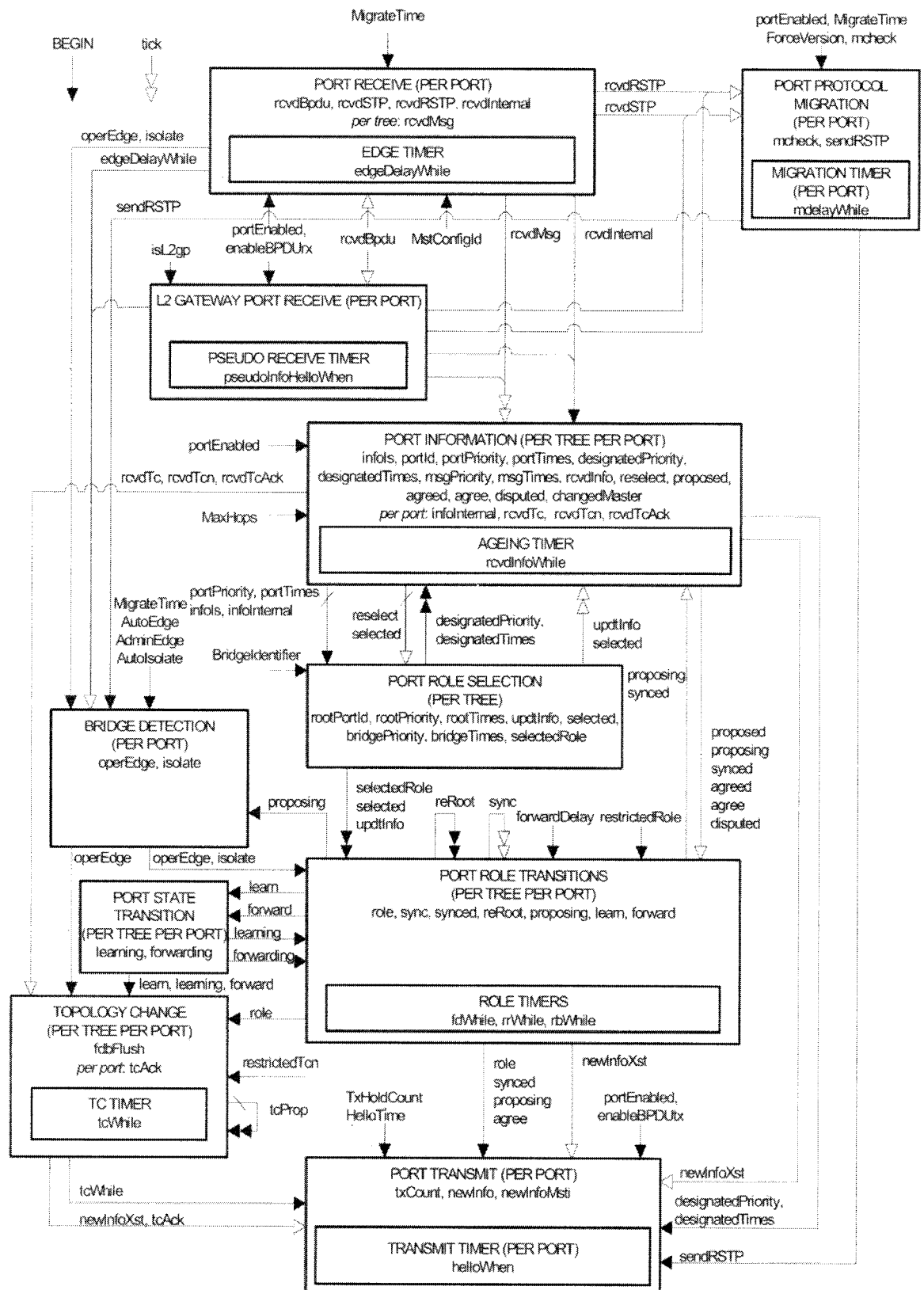
FIG. 1 shows an overview diagram of the state machines used to establish a spanning tree using the Spanning Tree Protocol.
Figure 2:
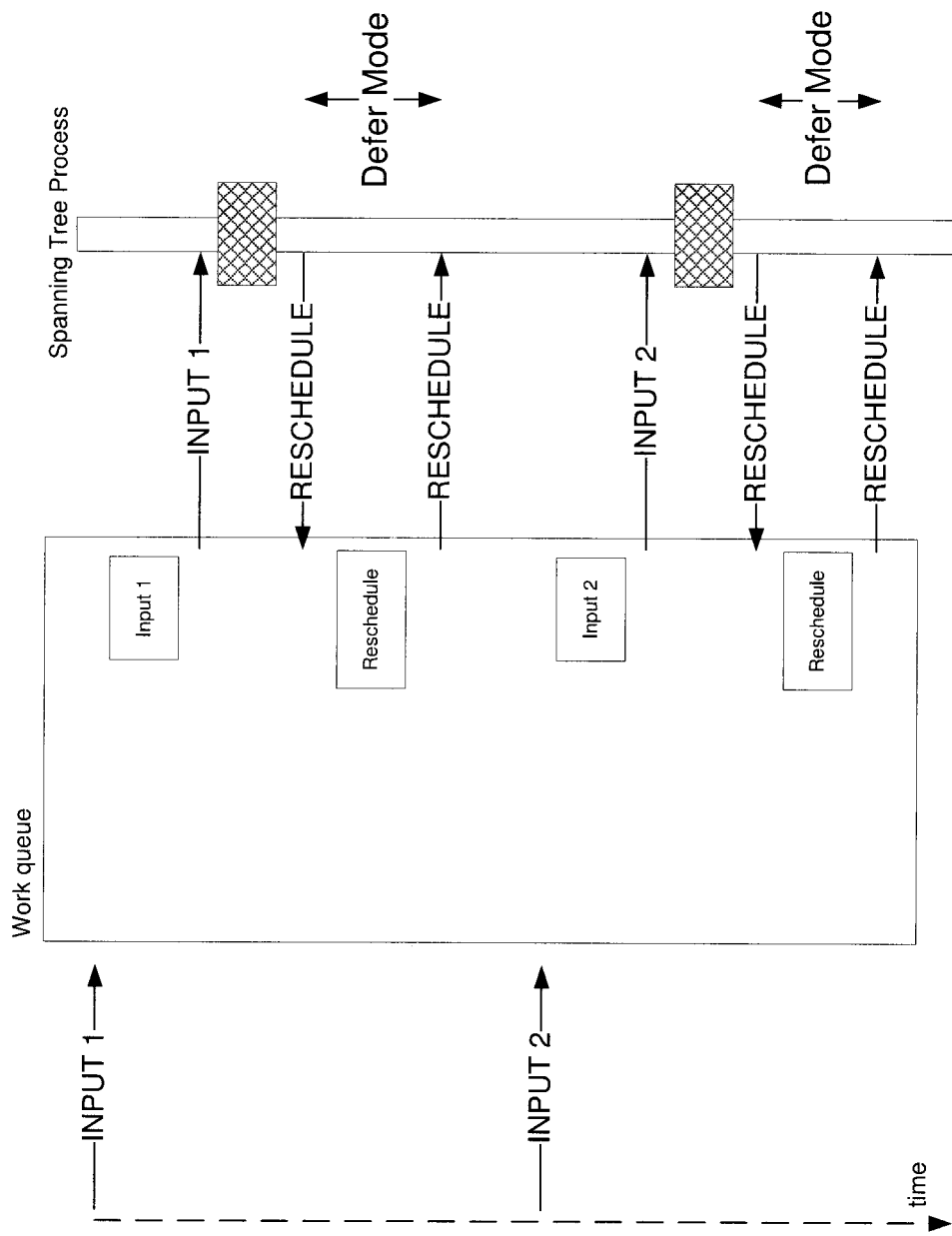
FIG. 2 shows schematically the operation of the bridge under relatively low load conditions.

FIG. 2 shows schematically the chronological sequence of events during the operation of a bridge when it is not under load. The system is initially in a stable state, i.e. the various state machines have been previously run and have arrived at a stable condition. As indicated above, this position will be maintained until an external input (INPUT 1) is received. The input is received and entered into the work queue. Since the queue does not contain any other items of work, the INPUT 1 is at the front of the queue and is processed as the next item. On receipt of the input, the state machines begin to run immediately. For a period of time represented by the shaded box, the state of the various state machines is not stable.

Once the state machines have run, they will again return to a stable state. At this point, a special "Reschedule Message" is created and added to the queue and the bridge is put into a defer mode. The queue may contain items of work to be carried out by the STP controller in the bridge, although in the example of FIG. 2 the queue is again empty. The various items of work are processed sequentially and jobs are held in the queue until they are processed. Whilst the bridge is in the defer mode, any external inputs will not initiate the state machines to run.

Depending on the workload condition of the controller, the queue may already contain a number of pending items of work to be completed or the queue may be relatively unpopulated if the system is not under load. In this example, the queue is empty. Any items in the queue ahead of the Reschedule Message have been processed, as shown. When the Reschedule Message reaches the end of the queue, it is processed, switching back from the defer mode.

Once the Reschedule Message has been processed, the controller may then go on to continue to process other items in the queue behind the Reschedule Message or which arrive subsequently. However, having received and processed the Reschedule Message, the network is returned from the defer mode to a normal, or active mode. In this active mode, the controller is in a state which is responsive to new external inputs. In this example, as soon as another external input (INPUT 2) arrives, the controller will initiate the operation of the state machines (as represented by the lower shaded box in FIG. 2) to re-determine a new stable state. In this way, the state machines are run as soon as the external input is received avoiding any delay in responding to, for example, changes in the topology of the network.

Figure 3:
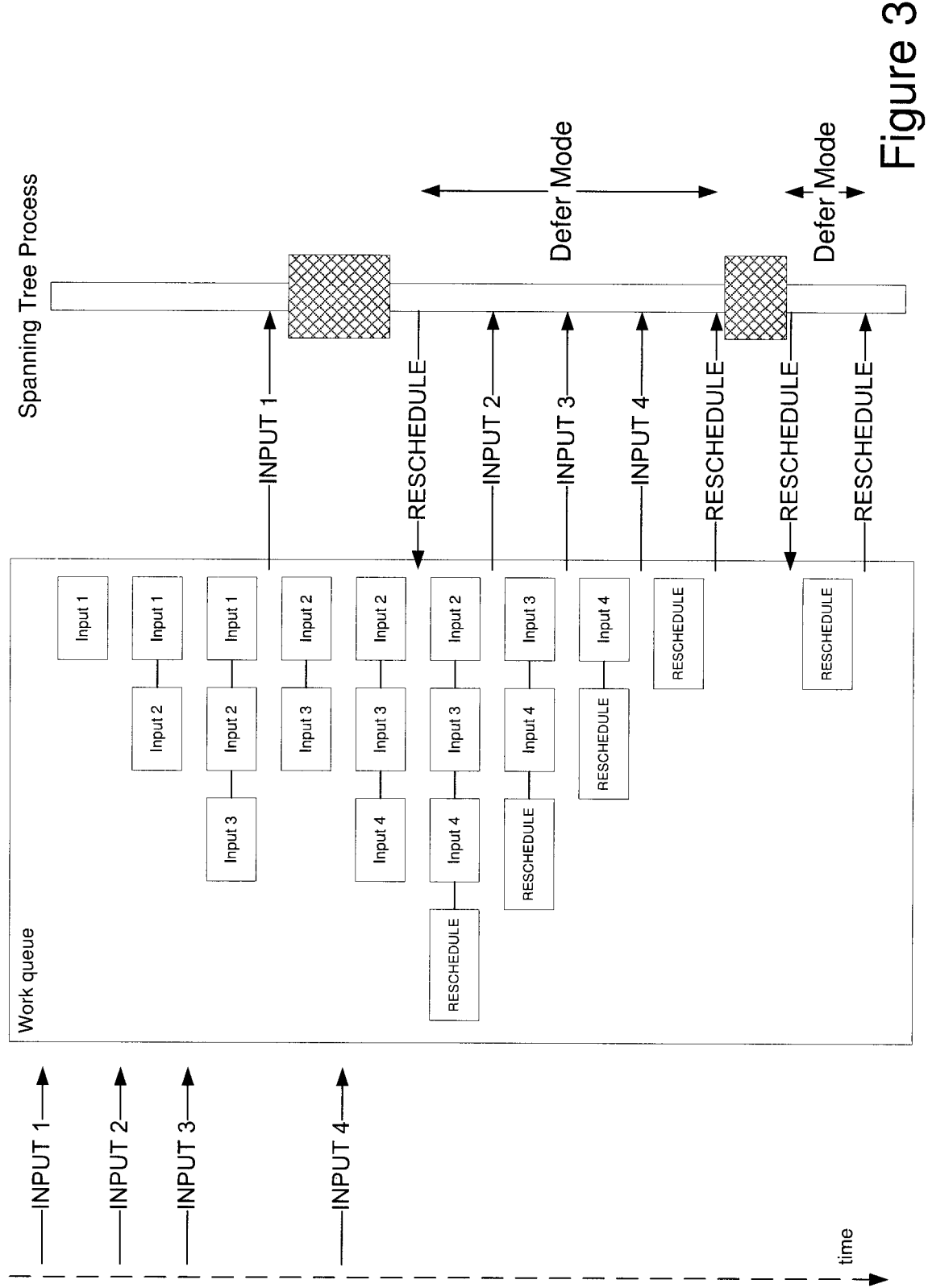
FIG. 3 shows the operation of the bridge under higher load conditions.

FIG. 3 shows the situation when the system is under load. In this case, multiple external inputs (INPUT 1-INPUT 4) are received. INPUT 1 is received and entered into the queue. However, as the bridge is already busy processing other tasks, INPUT 1 is not immediately passed to the initiate the state machines to run. In the interim INPUT 2 and INPUT 3 arrive and are added to the queue. Once the system is ready to process the next item in the queue, INPUT 1 is processed, which causes the controller to initiate running the state machines. Whilst the state machines are running another external input (INPUT 4) is received and is placed at the back of the work queue.

The state machines complete the task (i.e. have returned to a stable state) and a Reschedule Message is issued putting the bridge into the defer mode. The Reschedule Message is added to the queue of work items for the controller to complete, behind INPUT 4, INPUT 3 and INPUT 2. There may also be other tasks waiting to be processed which are not shown in this example.

When the system is under load, the number of items of work in the queue may be significantly greater meaning that the Reschedule Message is further down the queue and it will typically be longer before it is processed. Once the state machines have completed operation and returned to a stable state, the controller goes back to processing other items of work in the queue.

As shown in FIG. 3, an external input (INPUT 2) is processed next. However, the bridge is still in defer mode since the controller has not reached the Reschedule Message in the queue. In this instance, the controller updates state variables as a direct result of the external input (INPUT 2) but does not initiate running of the state machines. Rather, the state machines are left in an unstable state temporarily. The controller then simply continues processing the items of work in the queue.

Further external inputs (INPUT 3 and INPUT 4) successively reach the front of the queue and are processed. In the same way as for INPUT 2, the controller updates state variables as a direct result of the input, but does not initiate running of the state machines. Finally, the Reschedule Message reaches the front of the queue and is processed. The controller will then switch out of defer mode and into active mode. At this point the controller initiates running of the state machines to return the system to a stable state.

In this way, the controller is effectively running the state machines once for a batch of inputs (INPUT 2, INPUT 3 and INPUT 4), rather than running the state machines multiple times, once for each input. This means that the state machines are run less frequently, thereby reducing the overall processing load on the controller. This allows it to deal with other tasks to manage the higher load rather than spending significant amounts of time running the state machines.

The result of the above method is that when the system is not under load, the state machines are run with a minimum amount of delay allowing them to respond quickly to topology changes in the system and other triggers. However under load, the number of times the state machines are run is reduced in order to reduce the processing burden on the controller to provide an improvement in performance compared to running the state machines in response to every single external input. This means that the performance under load is improved without significantly compromising the ability of the system to respond to changes (for example, for protection switching).

The above-described embodiment of the present invention is responsive to the loading of the system by inserting the Reschedule Message into a queue. The length of the queue and the rate at which items in the queue are processed reflect the load on the system and effectively provide a delay before running the state machines in response to external inputs where the system is under load.

In an alternative embodiment of the invention, a modified version of the load monitoring may be achieved by using a token-bucket mechanism. In this arrangement, the system would operate in a similar way to that described above in that when an external input is received, the state machines are operated until they return to a stable condition. Before the state machines can run though, a token must be available from the notional bucket. It is assumed in this instance that at least one token is provisionally available. Once the state machines have been run, the token is used up.

New tokens will be added to the bucket at a predetermined rate until it is full (reaches a predetermined limit). As long as a token is available, the controller is able to run the state machines in response to external inputs. In this example, the rate at which the bucket is refilled with tokens is determined according to the rate at which the state machines should be run when the system is under stress. In other words, if it is desired to only run the state machines after a period T when the system is under stress, a token is added to the bucket at a rate corresponding to T.

In this way, when the system is not under stress and is operating at lower load level, the tokens should be replenished into the bucket at a rate which is greater than the rate at which they are used. The token bucket will therefore remain in a substantially full state, meaning that there will typically always be a token available to allow running of the state machines when an external input is received.

When the system is under load and the requirement to run the state machines exceeds the predetermined rate, the tokens in the bucket start to be depleted. Once the store of tokens in the bucket has been depleted, the bridge will go into defer mode and further external inputs will not trigger running of the state machines. If external inputs continue to arrive, the rate at which the state machines will run will correspond to that of the predetermined rate. In other words, the state machines will not be run until the next token becomes available and then not again until the subsequent token is available and so on.

The rate at which the bucket is refilled may be controlled to reflect the status of the system. For example, filling of the bucket may be changed to reflect different load conditions. Under high load, the filling rate may be reduced further than the predetermined rate mentioned above.

With the above arrangement, the size of the bucket can be controlled to provide a degree of delay before the rate at which the state machines are run is reduced. Under low load conditions the bucket is likely to be full or nearly full. If a burst of external inputs suddenly occurs, then until the bucket is empty, running of the state machines is not limited. This allows the system to cope with a small burst of external inputs before backing off.

If the system load does increase, the rate at which the tokens are removed from the bucket will exceed the rate at which they are added and the tokens in the bucket will start to be depleted, as described above. This means that if there is a transient increase in loading, the state machines will initially run immediately upon receipt of the external inputs. However, if the increase in load persists, the tokens will be depleted as the rate of arrival of the external inputs will exceed the rate at which tokens are added to the bucket. Once the bucket is empty, the rate at which the state machines run will decline to the permitted rate set by the rate at which the bucket is filled.

The size of the bucket may alternatively be selected to hold a maximum of one token. This means it will respond much more rapidly to even transient changes in the loading on the system. Even if two external inputs arrive in quick succession, the bucket will be emptied by the first and will not be replenished until after the predetermined period and so the running of the machines will be deferred In the above embodiment the invention is presumed to operate all the time, so that operation of the state machines can be delayed whenever the bridge is under load. However, the invention may be implemented in a selective manner, so that the bridge can be operated to use the invention at some times but switched back to operating without the invention under certain conditions.

The invention claimed is:

1. A method for managing operation of a spanning tree protocol process in a network bridge, the method comprising:

setting the network bridge to either:
an active mode, in which said network bridge processes items of work, and said spanning tree protocol process is run in response to a spanning tree protocol process triggering event; or
a defer mode in which said network bridge continues to process items of work, but said spanning tree protocol process is not run immediately in response to a spanning tree protocol process triggering event;
reverting from said defer mode to said active mode after a delay period corresponding to the load on the network bridge, based upon the number of pending tasks in a queue on said network bridge when said defer mode is set; and
setting said defer mode in response to running of said spanning tree protocol process.

2. A method for managing operation of a spanning tree protocol process according to claim 1, wherein said delay period is based upon the load on said network bridge.

3. A method for managing operation of a spanning tree protocol process according to claim 1, further comprising adding a new task to said queue as said defer mode is set, such that said delay period ends when said new task reaches the front of the queue.

4. A method for managing operation of a spanning tree protocol process in a network bridge, wherein said network bridge includes a token counter and said method comprises:
setting the network bridge to either:
an active mode, in which said network bridge processes items of work, and said spanning tree protocol process is run in response to a spanning tree protocol process triggering event; or
a defer mode in which said network bridge continues to process items of work, but said spanning tree protocol process is not run immediately in response to spanning tree protocol process triggering event;
periodically increasing the value of said token counter, whilst it is less than a maximum value;
reducing the value of said token counter when said spanning tree protocol process is run; and
setting said defer mode in response to running of said spanning tree protocol process when said token counter has a zero value, and reverting from said defer mode to said active mode after a delay period corresponding to the load on the network bridge, wherein said delay period corresponds to the period in which said token counter has a zero value.

5. A method for managing operation of a spanning tree protocol process according to claim 4, wherein the rate at which the value of said token counter is periodically increased is based on the maximum desired rate for running the spanning tree protocol process under high load conditions.

6. A method for managing operation of a spanning tree protocol process according to claim 1, wherein said method further comprises storing any triggering events received when said defer mode is set, for processing when said spanning tree protocol process is run.

7. A method for managing operation of a spanning tree protocol process according to claim 1, wherein running of said spanning tree protocol process includes running a plurality of state machines to determine a stable state of said network bridge parameters.

8. A network bridge for operating a spanning tree protocol process, the bridge comprising:
a controller arranged to run a spanning tree protocol process in response to a triggering event, wherein said network bridge can be set to be in either:
an active mode, in which said controller processes items of work, and runs a spanning tree protocol process run in response to a spanning tree protocol process triggering event; or
a defer mode in which said controller continues to process items of work, but a spanning tree protocol process is not run in response to a spanning tree protocol process triggering event,
said controller is arranged to revert said network bridge from said defer mode to said active mode after a delay period corresponding to the load on the network bridge, based upon the number of pending tasks in a queue on said network bridge when said defer mode is set; and
said controller is arranged to set said defer mode in response to running of said spanning tree protocol process.

9. A network bridge according to claim 8, wherein said delay period is based upon the load on said network bridge.

10. A network bridge according to claim 8, wherein said controller is arranged to add a new task to said queue as said defer mode is set, wherein said delay period ends when said new task reaches the front of the queue.

11. A network bridge for operating a spanning tree protocol process, wherein said network bridge includes a controller and a token counter, wherein said controller is arranged to:
run a spanning tree protocol process in response to a spanning tree protocol process triggering event;
periodically increase the value of said token counter, whilst it is less than a maximum value; and
reduce the value of said token counter when said spanning tree protocol process is run, wherein
said network bridge can be set to be in either:
an active mode, in which said processor processes items of work, and runs said spanning tree protocol process run in response to a spanning tree protocol process triggering event; or
a defer mode in which said processor continues to process items of work, but a spanning tree protocol process is not run in response to a spanning tree protocol process triggering event, and wherein
said controller is arranged to revert said network bridge from said defer mode to said active mode after a delay period corresponding to the load on the network bridge, and to set said defer mode in response to running of said spanning tree protocol process when said token counter has a zero value, wherein said delay period corresponds to the period in which said token counter has a zero value.

12. A network bridge according to claim 11, wherein said controller is arranged to periodically increase the value of said token counter at a rate based on the maximum desired rate for running the spanning tree protocol process under high load conditions.

13. A network bridge according to claim 8, wherein said controller stores any triggering events received when said defer mode is set, for processing when said spanning tree protocol process is run.

14. A network bridge according to claim 8, wherein said controller runs said spanning tree protocol process by running a plurality of state machines to determine a stable state of said network bridge parameters.

* * * * *